Patented May 22, 1928.

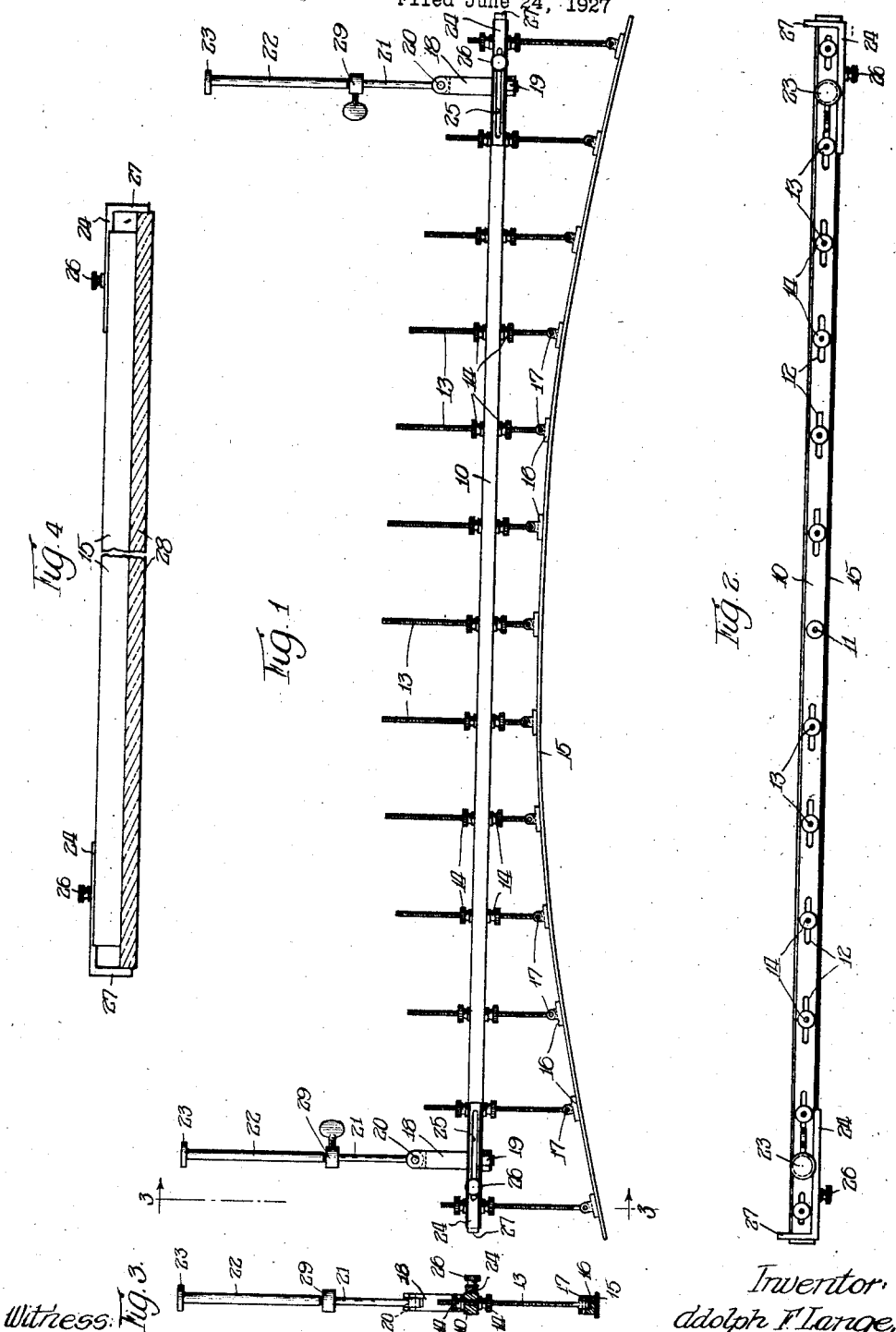

1,670,456

UNITED STATES PATENT OFFICE.

ADOLPH F. LANGE, OF CHICAGO, ILLINOIS.

FLEXIBLE AND ADJUSTABLE GAUGE.

Application filed June 24, 1927. Serial No. 201,046.

My invention relates to an improved gauge and particularly to a gauge which is adjustable to conform to any curve within a desired range, whereby it may be employed in cutting glass or other sheet material, which material is to be cut on a particular curved line.

In many automobiles now in use, the windshields at their lower edge closely fit the cowl of the car body on a curved line and also in mirrors, it is frequently true that the glass is curved and fits in a similarly shaped frame; and to supply glass for such usage, whether in the case of repair or initial installation, it is necessary to provide the glass cut with the particular curve which will effect an accurate and close fit in the frame in which it is to be mounted.

It is particularly desirable to have a very accurate fit in the case of automobile windshields, in that rain, wind and dirt will find their way into the automobile between the cowl and lower edge of the glass, in the event any clearance occurs at this point. In making repairs, particularly where no pattern is handy by which the glass can be cut, it is very difficult to determine the curve which will assure the proper fit, due to the fact that the line of contact between the lower edge of the glass and cowl is almost without exception located within the body structure and at the bottom of a narrow slot through which it is almost impossible to ascertain the true nature of the curve without the aid of some special instrumentalities.

Accordingly, one of the objects of my invention is to provide a gauge which may be used in installing glass in the above described manner, and with which the desired curve may be quickly and accurately determined.

It is a further object of my device to provide a gauge of the above described type which may be accurately centered and maintained in proper position both at the time of adjustment to conform to the particular curve, and at the time the gauge is being employed as a guide for the glass cutting or equivalent instrument, it being understood that my gauge is to be employed as a guide for determining the path of the cutting instrument during the cutting operation.

These and other objects are accomplished by means of the arrangement disclosed in the accompanying sheets of drawing, in which—

Figure 1 is a side elevation of a gauge constructed in accordance with my invention;

Figure 2 is a plan view as seen from the top of Figure 1;

Figure 3 is an end view in cross section taken on the line 3—3 of Figure 1 looking in the direction of the arrows; and Figure 4 is a showing reduced in size, of the gauge positioned on its side and held on top of a piece of glass as it will be placed during the cutting operation.

The various novel features of the invention will be apparent from the following description and drawings and will be particularly pointed out in the appended claims.

Referring to the drawings, it will be noted that the form of my invention illustrated in this application comprises a rigid bar 10 of any desired length having centrally located, a hole 11 passing therethrough, and on the opposite sides of the hole 11 a plurality of slots 12. Positioned through the slots and hole in a manner to freely slide when permitted to do so, are a series of threaded rods 13 carrying nuts 14 screw-threaded thereon and positioned on opposite sides of the bar 10. A flexible strip 15 is provided, preferably of steel, but which may be of any desired material, having on one face rigidly attached a plurality of lugs 16 having bearing holes 17 provided through their upper portions. The lower ends of the threaded rods 13 are pivotally mounted in the bearing 17 of the lugs. At each end of the frame or bar 10 there is a pivot support 18 mounted on the frame by means of the nut 19, having pivoted as at 20 to its upper end, rods 21. Slidably mounted on the rods 21 are the tubular extensions 22 provided with a flattened head 23 at its upper end and a collar and wing nut 29 at its lower end, the wing nut being employed for the purpose of locking the tubular extension in any desired adjusted position. On one of the side faces of the bar 10 and located at the ends thereof are extensible holding arms 24 provided with a slot 25 through which is positioned a headed bolt 26 screwed into the bar 10 and easily adjustable to permit the extensible holding arm to be moved to any desired position and tightly held in the manner desired, the arms 24 having right angular extensions 27 at their ends which are of greater length than the width of the bar 10 so that they project below the plane of the opposite side face of the bar 10 or a distance greater than the overall width of the gauge. This is for the purpose, as illustrated in Figure 4, of providing a means which will engage the side of the sheet material 28 such as glass, being cut so as to act as a holding and positioning means for the gauge.

In operation, when it is desired to supply a sheet of material such as for instance, glass for a wind shield of an automobile having a curve at the cowl, the first operation is to measure the height of the windshield opening in the center of the cowl to the cross-frame of the automobile body at the top of the car. The gauge is then employed after loosening the nuts 14 so that the flexible steel edge has sufficient clearance approximately one inch from the bar 10 and is substantially horizontal. The gauge is then positioned in the center of the windshield opening with the center screw post exactly in the center, after which the tubular extensions 22 are adjusted so that they are exactly the same length and with the flattened heads 23 firmly engaging the upper part of the windshield opening. When the windshield is so adjusted it is assured that the bar 10 will be properly positioned so that the further adjustments necessary to ascertain the curve may be made. In this position the center screw by means of the nuts 14 is adjusted to the position where it will bring the center of the flexible strip in engagement with the center of the cowl or the rubber base of the windshield opening. The balance of the screws are then adjusted until the flexible steel edge rests firmly along the base of the windshield opening in a manner to conform to the curve. When the parts are so regulated the nuts 14 are brought into close engagement with the bar 10 so as to lock the parts in the desired position. The next step is to place a piece of glass of the exact size required on a flat table in a horizontal position and to place the gauge thereon as shown in Figure 4, with the center screw positioned in the exact center of the glass. The extension arms 24 are next adjusted to cause the projections 27 to overlie and engage the edge of the glass as shown in Figure 4 so as to maintain the gauge in the desired central position. In this position, the flexible edge 15 is used as a guide for the cutting instrument whereby it is a comparatively easy matter to cut the edge of the glass sheet with the proper curve necessary for effecting a close and accurate fit with the cowl of the automobile.

This gauge may be employed in any similar installing operation where it is desirable to cut sheet material with a curved or irregular edge in a manner to conform the curve of a frame or other cooperating part. In such a case, the gauge is positioned and adjusted in a manner to bring the flexible edge 15 in conformity with the curve or irregular edge and is locked in the adjusted position. The gauge may then be placed on the sheet material and employed as a guiding edge for the cutting tool.

I claim:

1. A device of the character described, comprising an elongated flexible strip element, a plurality of means individually adjustable in two directions perpendicular to each other, constituting a mounting for said flexible strip element and by which said flexible strip element may be caused to assume any desired curve and means for holding said means in any adjusted position.

2. A device of the character comprising an elongated bar having a plurality of slots therethrough, threaded rods positioned through said openings and being capable of adjustment to any transverse position relative to said bar in any position in said slots, nuts threaded on said rods on opposite sides of said bar adapted to lock, said rods in any adjusted position, and a flexible strip element having lugs mounted on one face thereof, the ends of said rods being pivoted to said lugs.

3. A device of the character described, comprising a rigid frame member and a plurality of adjustable supports mounted in said frame member, said supports having a flexible strip element mounted on their ends, and a longitudinally extensible element mounted on each end of said frame member for determining the position thereof.

4. A device of the character described, comprising a rigid frame member, and a plurality of adjustable supports mounted in said frame member, said supports having a flexible strip element mounted on their ends, and a pair of elements each extensible in a different direction mounted on each end of said frame member for determining the position thereof.

5. A device of the character described, comprising a rigid frame member, and a plurality of adjustable supports mounted in said frame member, said supports having a flexible strip element mounted on their ends, and a longitudinally extensible element mounted on each end of said frame member for determining the position thereof, and holding said frame member in the desired position.

6. A device of the character described, comprising a rigid frame member, and a plurality of adjustable supports mounted in said frame member, said supports having a flexible strip element mounted on their ends, and a pair of elements, extensible in directions perpendicular to each other, mounted on each end of said frame element for determining the position thereof.

7. A device of the character described, comprising a rigid frame member, and a plurality of adjustable supports mounted in said frame member, said supports having a flexible strip element mounted on their ends, and a pair of elements, extensible in directions perpendicular to each other, mounted on each end of said frame element for determining the position thereof, one of said elements at each end acting to hold said frame element in the desired position.

Signed at Chicago, Illinois, 1927.

ADOLPH F. LANGE.